United States Patent [19]

Sueda et al.

[11] Patent Number: 4,859,275

[45] Date of Patent: Aug. 22, 1989

[54] REINFORCING PIECE PASTING APPARATUS FOR BINDING HOLE

[75] Inventors: Norio Sueda, Chiba; Hiroyasu Hoshino, Tokyo, both of Japan

[73] Assignee: Elm Industry Co., Ltd., Tokyo, Japan

[21] Appl. No.: 181,671

[22] Filed: Apr. 14, 1988

[30] Foreign Application Priority Data

May 7, 1987 [JP] Japan .............................. 62-111081

[51] Int. Cl.[4] .............................................. B32B 35/00

[52] U.S. Cl. .................................. 156/541; 156/584; 156/DIG. 48

[58] Field of Search .............. 156/540, 541, 542, 543, 156/584, DIG. 48

[56] References Cited

U.S. PATENT DOCUMENTS

| | | | |
|---|---|---|---|
| 2,189,296 | 2/1940 | Oskow | 156/540 |
| 3,668,047 | 6/1972 | Heller | 156/541 |
| 4,274,906 | 6/1981 | Clar | 156/541 |
| 4,310,379 | 1/1982 | Harrison | 156/541 |
| 4,557,789 | 12/1985 | Collins | 156/541 |

*Primary Examiner*—Willard Hoag
*Attorney, Agent, or Firm*—Oblon, Spivak, McClelland, Maier & Neustadt

[57] ABSTRACT

A reinforcing piece pasting an apparatus for pasting annular reinforcing piece around a binding which is punched before-hand on a document. The purpose of the invention is to provide a reinforcing piece pasting apparatus which, by a simple operation, enables one to feed a reinforcing piece to a prescribed position securely and one piece at a time, and to paste the reinforcing piece correctly around the binding hole.

The reinforcing piece pasting apparatus in accordance with the present invention has a base, a frame, and a handle whose base end parts are combined pivotally so as to be turnable relative with each other and which are urged by springs in the direction to have their tip parts separated further away. By inserting a document with a punched binding hole into the opening between the base and the handle to fit the binding hole to a projection on a pasting table formed on the base, and by closing the base and the handle in this state by applying a pressure on them from both sides, the reinforcing piece is fed on a supporting part piece by piece by a feeding mechanism, and the reinforcing piece fed is pressed against the document that is placed on the pasting table to be bonded to the periphery of the binding hole by means of a presser formed on the handle.

16 Claims, 3 Drawing Sheets

REINFORCING PIECE PASTING APPARATUS FOR BINDING HOLE

TECHNICAL FIELD OF THE INVENTION

The present invention relates to a reinforcing piece pasting apparatus for pasting an annular reinforcing piece around a binding hole which was punched beforehand in a document.

DESCRIPTION OF THE PRIOR ART

As an apparatus for punching a binding hole in a document, there have been known in the past various kinds of reinforcing piece pasting apparatuses that served also as punching devices which perforate a binding hole in a reinforcing piece pasted portion after a reinforcing piece is pasted on the document.

However, in such a reinforcing piece pasting apparatus, a binding hole is punched after a reinforcing piece is pasted on a document so that the apparatus cannot be used for pasting a reinforcing piece with a punched hole on a document in which there already exists a punched hole for binding. Namely, in order to reinforce an existing binding hole with a reinforcing piece by means of such a reinforcing piece pasting apparatus, not only must the holes in a document and in a reinforcing piece be aligned, but also these holes must be aligned exactly with the position of a binding hole to be punched anew by the reinforcing piece pasting apparatus. This is an extremely difficult work to be achieved, and if a correct positioning is not secured, a new binding hole will be punched at a position deviated from the existing holes, resulting in a clumsy binding of the document.

As an apparatus which resolves such a drawback, there has been disclosed, for example, Japanese Utility Model Laid Open Publication No. 61-34251 in the Gazette, a patch (reinforcing piece) pasting apparatus which can paste an annular patch to a document with a binding hole previously punched.

In this patch pasting apparatus, a stacked body of a large number of reinforcing pieces coated with a pressure-sensitive adhesive is supported by a pin erected in a patch supporting part so as to penetrate through the central holes of the reinforcing pieces. By bringing a document into a pressurized contact with the top of the stacked patches via a patch peeling ring that has its inner circumferential edge shaped in the form of a claw, it is arranged to have the topmost patch pasted on the document and to have the pasted patch separated with the claw from the rest of the patches in the stack by letting the pasted patch pass through the patch peeling ring.

However, in such a patch pasting apparatus, it is very difficult to peel off the topmost patch alone, often resulting in either a failure to realize a smooth separating action due to complete inability for the topmost patch to pass through the peeling ring or a separation of plural patches due to simultaneous passage of the patches through the peeling ring, depending upon the force applied.

Moreover, there were drawbacks such as a deterioration in the detachability of a patch due to increased adhesive force between the patches caused by an extremely large force applied to the stacked body of patches, and a decrease in the stickiness due to attachment of dust on the patch which is placed on a patch supporting part with its surface to be pasted exposed all the time.

OBJECTS OF THE INVENTION

It is the main object of the present invention to provide a reinforcing piece pasting apparatus of a simple constitution which is capable of securely pasting an annular reinforcing piece, one at a time, around a binding hole that is punched beforehand on a document.

It is another object of the present invention to provide a reinforcing piece pasting apparatus which is capable of securely feeding a reinforcing piece to a prescribed position one piece at a time, and is capable of accurately pasting it around a binding hole, by a simple operation as in the case of the well-known Hotchkiss punch.

SUMMARY OF THE INVENTION

In order to attain the above objects, the reinforcing piece pasting apparatus of the present invention is given a constitution in which there are provided a base, a frame and a handle with their base end parts pivotally combined so as to be turnable with respect to each other, being urged by springs in the direction which separates their tips mutually further apart. In use, a document with a punched binding hole is slipped into the opening between the base and the frame, is fitted to a projection on a pasting table formed on the base, a reinforcing piece is fed to a supporting part one piece at a time by means of a feeding mechanism by closing the base and the handle in this state by pressing them from both sides, and the fed reinforcing piece is pressed against the document placed on the pasting table by a presser formed on the handle to be stuck to the periphery of the binding hole.

The urging force of a spring provided between the base and the frame is set to be smaller than that of a spring provided between the frame and the handle. By so arranging, first a reinforcing piece is sent out to be placed on the supporting part by the operation of the feeding mechanism which is actuated by the closing of the base and the frame, and then the reinforcing piece fed to the above-mentioned position is moved toward the pasting table by being pushed by the presser, which is brought into operation by the closing of the frame and the handle.

The reinforcing piece is pushed down in a state in which the projection penetrates through the hole at its center so that, even when the postion of the reinforcing piece on the supporting part is off-centered to some extent, its position is adjusted by virtue of the projection during the pressing process, being pasted correctly eventually around the binding hole.

The reinforcing pieces are pasted with a prescribed spacing on a peeling tape which has engaging holes for feeding, and it is desirable to house the peeling tape in a cassettte which can be installed in a reinforcing piece pasting apparatus. With this arrangement, stacking of a large number of reinforcing pieces is no longer required, so that, not only does it become easy to load the reinforcing pieces on the reinforcing piece pasting apparatus, but also it becomes possible to securely feed the reinforcing piece to a prescribed position, piece by piece, by means of the feeding mechanism. In addition, the reinforcing piece which is pasted on the peeling tape can be separated from the tape without fail by folding the peeling tape back sharply at a position where the tape leaves the cassette.

The feeding mechanism for feeding the reinforcing pieces pasted on the peeling tape is preferred to be constructed with a tape feeding roller which has on its periphery engaging projections that are to engage with the engaging holes on the peeling tape, a ratchet which is fixed to the feeding roller, and a lever which turns the ratchet by an angle corresponding to one claw by engaging with the ratchet when the base and the frame are relatively displaced in the direction to bring them together.

A more concrete objects and features of the present invention will become clearer by description of an embodiment to be given in conjunction with the accompanying drawings.

DESCRIPTION OF PREFERRED EMBODIMENTS

An embodiment of the present invention will be described in detail in the following by making references to the drawings.

Figure 1:
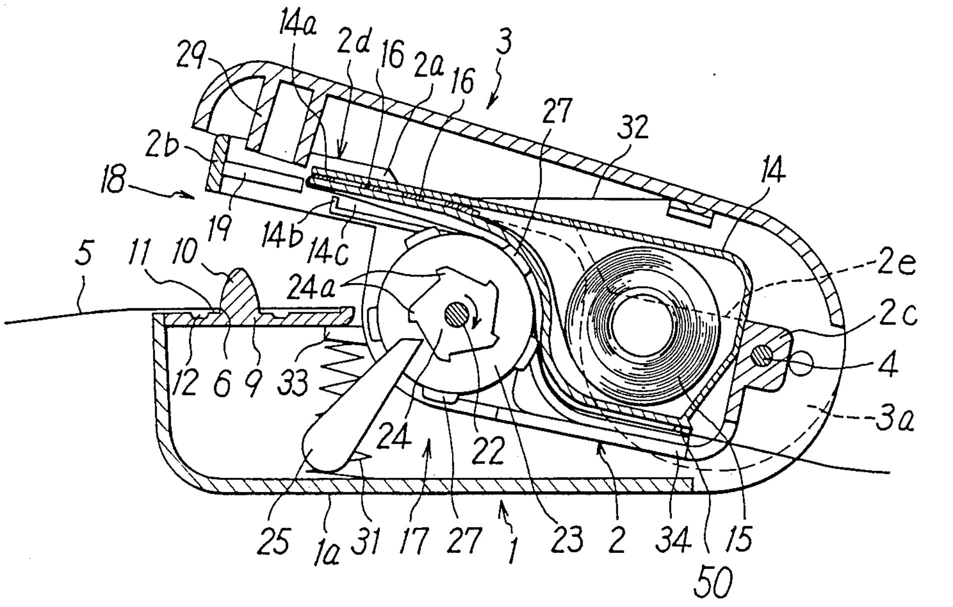
FIG. 1 is a sectional view which shows an embodiment of the reinforcing piece pasting apparatus of the present invention.

FIG. 1 illustrates a case of a reinforcing piece pasting apparatus which is constructed into a handy type suitable for reinforcing a binding hole. The reinforcing piece pasting apparatus is equipped with a base 1, a frame 2 and a handle 3 which are mounted pivotally at their base end parts on a common shaft 4 to permit them to turn relative to each other.

The base 1 is oblong in the lengthwise direction, having a box-form with its top surface and the base end surface opened, and is provided on its tip with a pasting table 9 for pasting a reinforcing piece. On the pasting table 9 there are formed a positioning projection 10 tapered toward the tip which fits into a binding hole punched beforehand on a document, a flat pressure receiving face 11 formed around the projection 10, and an annular recess 12 that encircles the pressure receiving face 11.

Further, the frame 2 has a form of a rectangular frame of oblong shape in the lengthwise direction, with the top and the bottom faces opened. The frame 2 has a width which is sufficiently narrow to permit its fitting to the base 1 and the handle 3, and on the tip of the frame 2 there is formed a narrow width part **2*d* obtained by cutting away the lower parts of a side wall 2*a* and a front wall 2*b*. On the other hand, on the base end part of the frame 2 there is formed a recessed step part 2*e* by cutting away the top parts of the side wall 2*a* and a rear wall 2*c***.

Figure 2:
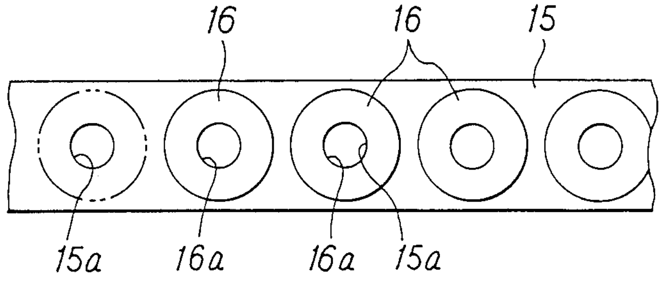
FIG. 2 is a partial plan view of a peeling tape.

On the frame 2 there is installed a cassette 14 with a built-in roll-form peeling tape 15 freely attachably and detachably disposed therein. As shown in FIG. 2, on the peeling tape 15 there are punched engaging holes **15*a* for conveying, that have the same size as that of the hole 16*a* in the reinforcing piece 16, in the lengthwise direction with a predetermined separation between them, and in addition, there are pasted annular reinforcing pieces 16 coated with a pressure-sensitive agent on the tape with their holes precisely positioned over the engaging holes 15*a*. The peeling tape 15 is abruptly bent back, and its direction of movement is reversed after it is led out of a bill part 14*a* formed on the tip of the cassette 14, introduced into a guiding groove 14*c* formed by ribs 14*b* protruded from both side walls 2*a* to the bottom surface of the cassette 14, and it is ejected to the outside from the base end part of the base 1 while it is conveyed by a feeding mechanism 17 with a predetermined pitch. Here, a reinforcing piece 16 pasted on the peeling tape 15 is separated from the tape 15 at the bending portion of the peeling tape 15 at the bill part 14*a*, by proceeding straight without being bent back and following the tape 15, to be sent to a supporting part 18 formed on the tip of the narrow width part 2*d* opposite to the bill part 14*a***.

Figure 3:
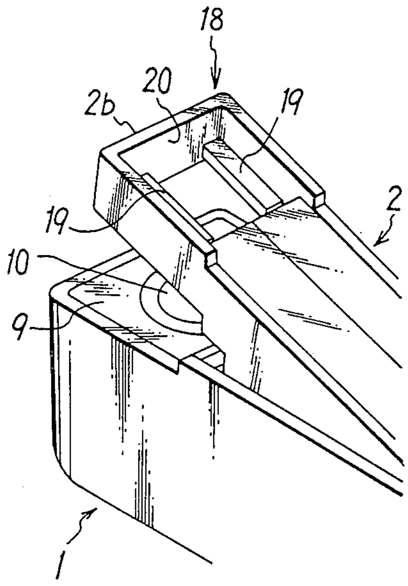
FIG. 3 and FIG. 4 are perspective views of the important parts of FIG. 1 in different operating conditions.
Figure 4:
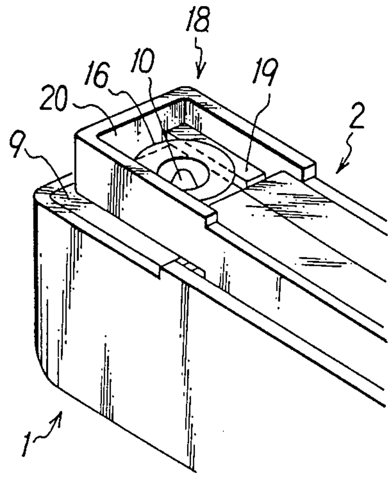

As may be seen from FIG. 3, the supporting part 18 consists of a pair of placing pieces 19 and 19 on which are placed both end parts of the reinforcing piece 16, and a positioning stopper 20 to which the tip of the reinforcing piece 16 is brought to a contact. The pair of placing pieces 19 and 19 are disposed on the inside of the side walls **2*a* of the frame 2, opposite to each other with a separation which is smaller than the outer diameter of the reinforcing piece 16 and is sufficiently larger than the diameters of the holes 16*a* of the reinforcing piece 16. Further, the role of the stopper 20 is played by the front wall 2*b* of the frame 2. With these placing pieces 19 and 19 and the stopper 20, the reinforcing piece 16 which is peeled off the tape and sent there is suported with its hole 16*a* at the position corresponding to the position of the projection 10 on the base 1, as shown in FIG. 4**.

On the other hand, the feeding mechanism 17 consists of a tape feeding roller 23 attached turnably to the side wall **2*a* of the frame 2 by means of a shaft 22, a ratchet 24 fixed coaxially to the feeding roller 23, and a ratchet lever 25 fixed to the base 1 with a predetermined direction of rotation. On the outer periphery of the feeding roller 23 there are provided engaging projections 27 which are to engage with the engaging holes 15*a* in the peeling tape 15, with a separation equal to that between the engaging holes 15*a*. On the other hand, on the periphery of the ratchet 24, the same number of claws as that of the engaging projection 27*m* are formed with a predetermined spacing. When the frame 2 and the base 1 are turned relatively in the direction of closing their tips, the ratchet 24 is turned in the direction of the arrow by the ratchet lever 25 by an angle that corresponds to one claw. As a result, the feeding roller 23 is turned and feeds the peeling tape 15 by a length corresponding to one spacing between the engaging holes 15*a*—that is, the spacing between the reinforcing pieces 16**.

The handle 3 positioned above the frame 2 has a box-form oblong in the lengthwise direction, formed with its bottom face opened and its width comparable to that of the base 1. At the base end part of the handle 3 there is provided a semicircular linking piece **3*a* which bulges out downward from the side wall, with the shaft 4 pivotably mounted on the position of the linking piece 3*a*, while an annular presser 29 is provided on the tip of the handle 3. When the handle 3 is turned relative to the base 1 and the frame 2 in the direction to close the handle 3 on the base 1, the presser 29 pushes out a reinforcing piece 16 supported on the supporting part 18 toward the position of engagement with the projection 10 on the pasting table 9, and then pastes the reinforcing piece 16 by pressing onto the periphery of the binding hole of the document which is set on the pasting table 9. The presser 29 is formed to have an outer diameter which is slightly smaller than the gap between the pair of opposing placing pieces 19 and 19, and further, its bottom face is made into an annular surface for pressing the reinforcing piece 16 to the document 5 placed on the pressure receiving face 11 of the pasting table 9**.

The base 1, the frame 2, and the handle 3 are urged by means of springs 31 and 32 that are provided between them in the direction of separating their tip parts. The coils spring 31 which separates the frame 2 from the base 1 is provided between the bottom wall 1*a* of the base 1 and a spring shoe 33 that projects from the frame 2 and is compressed when the frame 2 is pivoted toward the base 1. The flat or rodlike spring 32 which keeps the handle 3 away from the frame 2 is arranged between the ceiling wall of the handle 3 and the top surface of the cassette 14 loaded in the frame 2 with its one end on the handle 3 side fixed, serving also as a pressing member for the cassette 14. The urging torques of the springs 31 and 32 are set to maintain the relation that the urging torque of the spring 31 between the base 1 and the frame 2 is smaller than the urging torque of the spring 32 between the frame 2 and the handle 3.

In order to paste a reinforcing piece around a binding hole in a document by the use of the reinforcing piece pasting apparatus described above, first, the cassette 14 is loaded from above into the frame 2 in a state in which the handle 3 and the frame 2 are separated sufficiently wide. Then the engaging holes 15*a* in the peeling tape 15 which is bent back along the guiding groove 14*c* are engaged with the engaging projections 27 on the feeding roller 23. Next the handle 3 is returned to the state as shown in FIG. 1. By so doing, the cassette 14 is pushed against to be engaged with the rear wall 2*c* of the frame 2 and with the ribs 34 projected from the lower end of the side walls 2*a* and it makes a sliding contact with the portions other than the engaging projections 27 on the outer periphery of the feeding roller 23 in such a way as not to obstruct the rotation of the roller 23 while being maintained at a prescribed position by being pressed by the spring 32 on its top surface.

Figure 5:
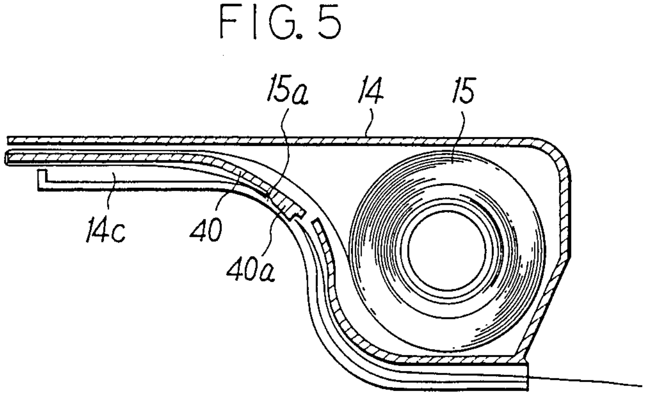
FIG. 5 is a sectional view of a tape cassette with a different constitution.

In this case, it is described to constitute the cassette 14 so as to realize an automatic engagement of the engaging holes 15*a* of the peeling tape 15 with the engaging projections 27 of the feeding roller 23 when the cassette 14 is loaded into the frame 2. For this purpose, it is preferred to provide an engaging elastic piece 40 having on its tip a projection 40*a* which engages with the engaging hole 15*a* of the peeling tape 15, within the guiding groove 14*c* in the cassette 14, as shown in FIG. 5, to let, when the cassette 14 is loaded in the state where the projection 40*a* is engaged with the peeling tape 15, the engaging projection 27 of the feeding roller 23 collide with the projection 40*a* to deform the engaging elastic piece 40 and to push the projection 40*a* out of the engaging hole 15*a* to be engaged in turn with the engaging hole 15*a*.

Moreover, it is desirable to suppress an unnecessary rotation of the feeding roller 23 by increasing its rotational resistance.

Next, by inserting a document 5 with a previously punched hole 6 into the space between the base 1 and the frame 2, the binding hole 6 is fitted to the projection 10 on the pasting table 9.

Figure 6:
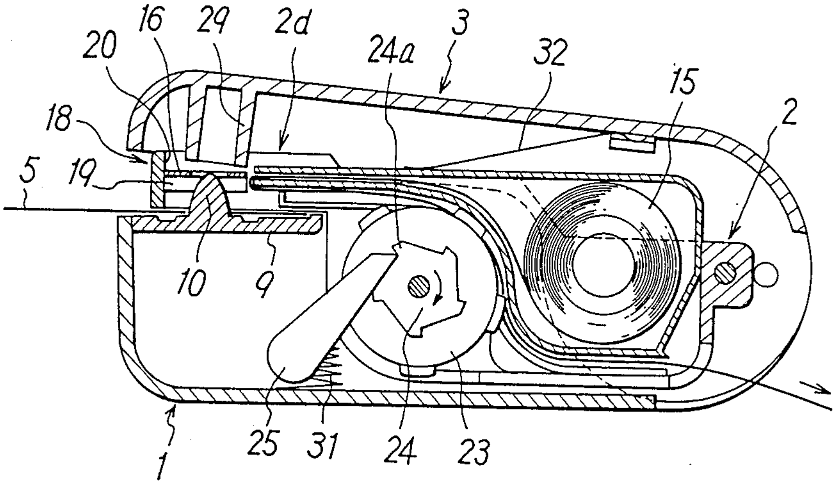
FIG. 6 and FIG. 7 are sectional views of the reinforcing piece pasting apparatus of the present invention in different operating conditions.

When the base 1 and the handle 3 are pressed in this state from both sides, the base 1 and the frame 2 are turned relatively to the position where the narrow width part 2*d* is pushed against the pasting table 9 by compressing the spring 31, keeping the relative distance between the frame 2 and the handle 3, as shown in FIG. 6, because the urging force of the spring 31 between the base 1 and the frame 2 is smaller than the urging force of the spring 32 between the frame 2 and the handle 3. At the same time, the tip of the ratchet lever 25 pushes against a claw 24*a* of the ratchet 24 to turn the ratchet 24 by an angle corresponding to one claw. As a result, the peeling tape 15 is sent out by a distance corresponding to its one pitch, by which the reinforcing piece 16 pasted on the peeling tape 15 is separated from the tape and is sent out to the pair of placing pieces 19 and 19 at the supporting part 18 to be held at a position abutting the stopper 20.

Figure 7:
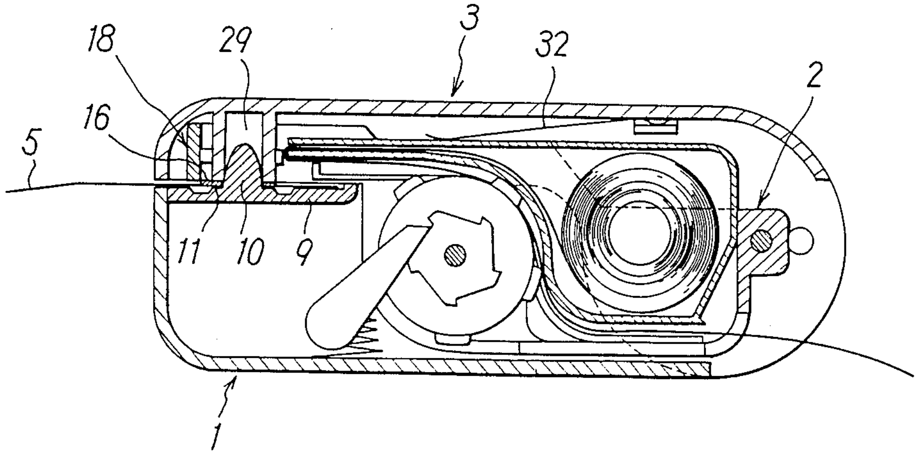

Moreover, by a further pressing on the base 1 and the handle 3, the handle 3 and the frame 2 are turned in the direction to come relatively closer by deforming the spring 32, with the presser 29 pushing down the reinforcing piece 16 on the supporting part 18 along the surface of the projection 10, as illustrated in FIG. 7. As a result of this action, the reinforcing piece 16 is pushed against the document 5 on the pressure receiving face 11 formed around the projection 10 by the bottom surface of the presser 29, to be bonded onto the circumference of the binding hole 6. In this action, even if the position of the reinforcing piece 16 on the supporting part 18 is off-centered to some extent, its position is adjusted by the projection 10 during the process of being pushed down along the projection 10, so that the piece 16 can be pasted correctly around the previously punched hole 6.

When the pressing on the base 1 and the handle 3 is released, they return to the situation as shown in FIG. 1 due to the urging forces of the springs 31 and 32. At this time, the spring shoe 33 pushes against the bottom face of the pasting table 9, by which a further turning of the frame 2 is regulated.

Furthermore, it is desirable to provide a checking mechanism against a reverse rotation of the feeding roller 23 which might occur at the time of releasing the press on the base 1 and the handle 3. However, the reverse rotation may be arranged to be checked by increasing the rotational resistance of the feeding roller 23.

By repeating the operation as described in the foregoing, it is possible to paste a reinforcing piece 16 one by one around each binding hole of a document 5.

Now, a used peeling tape 15 which is devoid of reinforcing piece 16 is sent out successively from the rear end part of the base 1 so that it may be cut at an appropriate length when it reaches a sufficient length. In this case, the cutting may be faciltated by providing a cutting blade 50 at the rear end edge of the base 1 or the like position as shown in FIG. 1. The cutting blade 50 may also be provided either on the frame 2 or on the handle 3.

Finally, in the foregoing embodiment there was illustrated the case of constituting a pasting apparatus adapted to a handy type for reinforcing a single binding hole. However, by providing plural sets of pasting tables 9, supporting parts 18, pressers 29, cassettes 14, and so forth side by side for one set consisting of a base 1, a frame 2, and a handle 3, it is possible to obtain a constitution by which a plurality of binding holes can be reinforced simultaneously.

What is claimed is:

1. A reinforcing piece pasting apparatus for binding holes, said apparatus comprising:
(a) a base having a base end part and a tip part;
(b) a frame having a base end part;
(c) a handle having a base end part and a tip part;
(d) wherein the base end parts of said base, said frame, and said handle are combined pivotally so as to be relatively turnable;
(e) a first spring provided between said base and said frame;
(f) a second spring provided between said frame and said handle;
(g) wherein said base and said handle are urged by said springs in a direction to separate their tip parts further away;
(h) wherein the urging torque of said first spring is smaller than the urging torque of said second spring;
(i) a pasting table provided on the tip portion of said base, said pasting table being equipped with a positioning projection having a connical apex portion for engaging with a binding hole in a document;
(j) a feeding mechanism providing on said frame for feeding reinforcing pieces coated with a pressure-sensitive adhesive agent one piece at a time, said feeding mechanism being interlocked with the relative rotation between said frame and said base;
(k) a supporting part provided on said frame for supporting a reinforcing piece that is fed at a position corresponding to the projection on said pasting table, said supporting part comprising:
(i) a pair of opposing placing pieces separated by a distance smaller than the outer diameter of the reinforcing pieces and greater than the diameters of the central holes in the reinforcing pieces and
(ii) a stopper with which the tip of the reinforcing pieces is brought to a contact; and
(l) an annular presser provided on the tip portion of said handle for pushing out the reinforcing pieces on said supporting part to an engaging position with the projection on said pasting table and for pressing and pasting each reinforcing piece around a binding hole on a document that is set on said pasting table.

2. A reinforcing piece pasting apparatus as claimed in claim 1 wherein plural sets each one of which comprises a pasting table, a supporting part, a feeding mechanism, and an annular presser are provided for one set comprising a base, a frame, and a handle for simultaneously pasting plural reinforcing pieces on plural binding holes in one sheet.

3. A reinforcing piece pasting apparatus as claimed in claim 2 wherein:
(a) said feeding mechanism feeds a peeling tape with a predetermined pitch;
(b) said feeding mechanism is within a cassette that is freely loadable in said frame and freely removable therefrom; and
(c) the reinforcing pieces are pasted on the peeling tape with a prescribed separation.

4. A reinforcing piece pasting apparatus as claimed in claim 3 and further comprising means for bending the peeling tape back abruptly where it leaves the cassette to separate the reinforcing pieces from the peeling tape.

5. A reinforcing piece pasting apparatus as claimed in claim 3 wherein a cutting blade for cutting a portion of the used peeling tape is provided on said base, said frame, or said handle.

6. A reinforcing piece pasting apparatus as claimed in claim 3 wherein:
(a) said second spring is arrange between said handle and the cassette which is loaded in said frame and
(b) said second spring serves also as a pressing member for holding the cassette in its state of installment in said frame.

7. A reinforcing piece pasting apparatus as claimed in claim 3 wherein said feeding mechanism comprises:
(a) a tape feeding roller having on its periphery engaging projections for engaging with engaging holes in the peeling tape;
(b) a ratchet fixed to said feeding roller; and
(c) a lever for turning said ratchet by an angle corresponding to one claw by engaging with said ratchet when said base and said frame are moved relatively in the direction to bring them together.

8. A reinforcing piece pasting apparatus as claimed in claim 7 and further comprising means for preventing excessive rotation of said feed roller.

9. A reinforcing piece pasting apparatus for binding holes, said apparatus comprising:
(a) a base having a base end part and a tip part;
(b) a frame having a base end part;
(c) a handle having a base end part and a tip part;
(d) wherein the base end parts of said base, said frame, and said handle are combined pivotally so as to be relatively turnable;
(e) a first spring provided between said base and said frame;
(f) a second spring provided between said frame and said handle;
(g) wherein said base and said handle are urged by said springs in a direction to separate their tip parts further away;
(h) wherein the urging torque of said first spring is smaller than the urging torque of said second spring;
(i) a plurality of pasting tables provided on the tip portion of said base, each one of said plurality of pasting tables being equipped with a positioning projection having a connical apex portion for engaging with a binding hole on a document;
(j) A plurality of feeding mechanisms provided on said frame, each one of said plurality of feeding mechanisms being adapted for feeding reinforcing bases coated with a pressure-sensitive adhesive agent one piece at a time, said plurality of feeding mechanisms being interlocked with the relative rotation between said frame and said base;
(k) a plurality of supporting parts provided on said frame, each one of said plurality of supporting parts being adapted for supporting a reinforcing piece that is fed at a position corresponding to the projection on the corresponding one of said plurality of pasting tables; and
(l) a plurality of annular pressers, each one of said plurality of annular pressers being provided on the tip portion of said handle for pushing out the reinforcing piece on the corresponding one of said plurality of supporting parts to an engaging position with the projection on the corresponding of said plurality of pasting tables and for pressing and pasting each reinforcing piece around a corresponding binding hole on a document that is set on said plurality of pasting tables.

10. A reinforcing piece pasting apparatus as claimed in claim 9 wherein each one of said plurality of supporting parts comprises:

(a) a pair of opposing placing pieces separated by a distance smaller than the outer diameters of the reinforcing pieces and greater than the diameters of the central holes in the reinforcing pieces and (b) a stopper with which the tip of each reinforcing piece is brought to a contact.

11. A reinforcing piece pasting apparatus as claimed in claim 9 wherein:

(a) each one of said plurality of feeding mechanism feeds a feeding tape with a predetermined pitch;

(b) each one of said plurality of feeding mechanisms is housed in a corresponding cassette that is freely loadable in said frame and freely removable therefrom; and (c) the reinforcing pieces are pasted on the peeling tapes with a prescribed separation.

12. A reinforcing piece pasting apparatus as claimed in claim 11 and further comprising a plurality of means for bending the peeling tapes back abruptly where they leave the corresponding cassettes to separate the reinforcing pieces from the peeling tapes.

13. A reinforcing piece pasting apparatus as claimed in claim 11 wherein a cutting blade for cutting a portion of each one of the used peeling tapes is prevent on said base, said frame, or said handle.

14. A reinforcing piece pasting apparatus as claimed in claim 11 wherein:

(a) said second spring is arranged between said handle and one of the cassettes which is loaded in said frame and (b) said second spring serves also as a pressing member for holding said one of the cassettes in its state of installment in said frame.

15. A reinforcing piece pasting apparatus as claimed in claim 11 wherein each one of said plurality of feeding mechanisms comprises:

(a) a tape feeding roller having on its periphery engaging projections for engaging with engaging holes in the corresponding peeling tape;

(b) a ratchet fixed to said feeding roller; and (c) a lever for turning said ratchet by an angle corresponding to one claw by engaging with said ratchet when said base and said frame are moved relatively in the direction to bring them together.

16. A reinforcing piece pasting apparatus as claimed in claim 15 and further comprising means for preventing excessive rotation of said plurality of feed rollers.

* * * * *